United States Patent [19]

Shirato et al.

[11] Patent Number: 5,204,689

[45] Date of Patent: Apr. 20, 1993

[54] INK JET RECORDING HEAD FORMED BY CUTTING PROCESS

[75] Inventors: Yoshiaki Shirato, Yokohama; Yasushi Takatori, Sagamihara; Toshitami Hara, Tokyo; Yukuo Nishimura, Sagamihara; Michiko Tanaka, Tokyo, all of Japan

[73] Assignee: Canon Kabushiki Kaisha, Tokyo, Japan

[21] Appl. No.: 711,418

[22] Filed: Jun. 5, 1991

Related U.S. Application Data

[63] Continuation of Ser. No. 632,610, Dec. 27, 1990, abandoned, which is a continuation of Ser. No. 403,860, Sep. 1, 1989, abandoned, which is a continuation of Ser. No. 188,071, Apr. 28, 1988, abandoned, which is a continuation of Ser. No. 13,172, Feb. 9, 1987, abandoned, which is a continuation of Ser. No. 846,472, Mar. 31, 1986, abandoned, which is a continuation of Ser. No. 750,985, Jul. 1, 1985, abandoned, which is a continuation of Ser. No. 639,531, Aug. 9, 1984, abandoned, which is a continuation of Ser. No. 543,224, Oct. 20, 1983, abandoned, which is a continuation of Ser. No. 362,579, Mar. 29, 1982, abandoned, which is a continuation of Ser. No. 132,774, Mar. 24, 1980, abandoned.

[30] Foreign Application Priority Data

Apr. 2, 1979 [JP] Japan .................................. 54-39478

[51] Int. Cl.⁵ .............................................. B41J 2/05
[52] U.S. Cl. ................................... 346/1.1; 346/140 R
[58] Field of Search ................................ 346/140, 1.1

[56] References Cited

U.S. PATENT DOCUMENTS

| | | |
|---|---|---|
| 3,177,800 | 4/1965 | Welsh . |
| 3,683,212 | 8/1972 | Zoltan .................... 346/140 X |
| 3,747,120 | 7/1973 | Stemme .................. 346/140 X |
| 3,878,519 | 4/1975 | Eaton ........................ 346/1 |
| 3,940,773 | 2/1976 | Mizoguchi ................ 346/140 |
| 3,965,330 | 6/1976 | Williams ................ 346/76 PH X |
| 3,967,092 | 6/1976 | Conta .................. 346/76 PH X |
| 4,104,646 | 8/1978 | Fischbeck ................ 346/140 |
| 4,131,899 | 12/1978 | Christov ................ 346/140 |
| 4,243,994 | 1/1981 | Kobayashi ................ 346/140 |
| 4,251,824 | 2/1981 | Hara ........................ 346/140 |
| 4,296,421 | 10/1981 | Hara et al. ................ 346/140 |
| 4,313,684 | 2/1982 | Tazaki et al. .............. 400/322 |
| 4,317,124 | 2/1982 | Shirato et al. ............ 346/140 |
| 4,330,787 | 5/1982 | Sato et al. ................ 346/140 |
| 4,334,234 | 6/1982 | Shirato .................... 346/140 |
| 4,335,389 | 6/1982 | Shirato et al. ............ 346/140 |
| 4,336,548 | 6/1982 | Matsumoto ................ 346/140 |
| 4,337,467 | 6/1982 | Yano ........................ 346/1.1 |
| 4,338,611 | 7/1982 | Eida ........................ 346/75 |
| 4,339,762 | 7/1982 | Shirato et al. ............ 346/140 |
| 4,343,968 | 8/1982 | Toyomura ................ 178/23 |
| 4,345,262 | 8/1982 | Shirato .................... 346/140 |
| 4,353,079 | 10/1982 | Kawanabe ................ 346/140 |
| 4,392,907 | 7/1983 | Shirato et al. ............ 156/252 |
| 4,458,256 | 7/1984 | Shirato et al. ............ 346/140 |
| 4,463,359 | 7/1984 | Ayata et al. .............. 346/1.1 |
| 4,723,129 | 2/1988 | Endo ........................ 346/140 X |

FOREIGN PATENT DOCUMENTS

2115530 10/1971 Fed. Rep. of Germany .
2532037 1/1976 Fed. Rep. of Germany .
2843064 4/1979 Fed. Rep. of Germany .

OTHER PUBLICATIONS

IEEE Transactions on Industry Applications vol. IA-13, No. 1, Jan./Feb., 1977.

*Primary Examiner*—Joseph W. Hartary
*Attorney, Agent, or Firm*—Fitzpatrick, Cella, Harper & Scinto

[57] ABSTRACT

An ink jet recording head comprising a plurality of discharge openings for discharging ink, a plurality of liquid passageways for holding ink and a plurality of heat generating members. Each of the heat generating members corresponds to a liquid passageway for providing thermal energy to the ink in the liquid passageway for abruptly forming a bubble for discharging ink from the discharge opening. Each heat generating member has a pair of electrodes for driving the heat generating member individually and the electrodes and corresponding heat generating member form a U-shaped wiring portion. The recording head may be manufactured using a cutting process.

50 Claims, 5 Drawing Sheets

INK JET RECORDING HEAD FORMED BY CUTTING PROCESS

This application is a continuation of application Ser. No. 07/632,610, filed Dec. 27, 1990, now abandoned, which is a continuation of application Ser. No. 07/403,860, filed Sep. 1, 1989, now abandoned, which is a continuation of application Ser. No. 07/188,071, filed Apr. 28, 1988, now abandoned, which is a continuation of application Ser. No. 07/013,172, filed Feb. 9, 1987, now abandoned, which is a continuation of application Ser. No. 06/846,472, filed Mar. 31, 1986, now abandoned, which is a continuation of application Ser. No. 06/750,985, filed Jul. 1, 1985, now abandoned, which is a continuation of application Ser. No. 06/639,531, filed Aug. 9, 1984, now abandoned, which is a continuation of application Ser. No. 06/543,224, filed Oct. 20, 1983, now abandoned, which is a continuation of application Ser. No. 06/362,579, filed Mar. 29, 1982, now abandoned, which is a continuation of application Ser. No. 06/132,774, filed Mar. 24, 1980, now abandoned.

BACKGROUND OF THE INVENTION

1. Field of the Invention

This invention relates to a droplet forming apparatus which causes injection liquid generally called ink to discharge and fly as droplets through an orifice by imparting a thermal action to the liquid.

2. Description of the Prior Art

Among the various known recording systems, the so-called ink jet recording method which is a non-impact recording system substantially free of noise during the recording and which enables recording to be effected on plain paper at high speed without requiring the fixation treatment is accepted as a very useful recording system. About this ink jet recording method, various systems have heretofore been proposed and improvements have been made and some ink jet recording systems have already become commercially available while, on the other hand, some ink jet recording systems are undergoing the efforts to put them into practice.

The ink jet recording method effects recording by causing small droplets of recording liquid called ink to fly on various action principles and causing them to adhere to a recording member such as paper or the like.

In this ink jet recording method, use is usually made of an apparatus provided with a recording head having a discharge orifice through which ink may discharge and fly as small droplets and an inflow opening through which the ink may flow in. There are various types of such apparatus depending on the differences in the system for forming small droplets of ink.

For example, one of these types is such that ink is supplied under pressure or under natural supply condition (such as the supply condition utilizing the capillary phenomenon) from an ink supply tank into a predetermined chamber and a voltage is applied between the ink in the chamber and an electrode installed forwardly of the discharge orifice to cause the ink to electrostatically discharge through the discharge orifice.

In another type of ink jet apparatus, ink is caused to discharge and fly as ink droplets by mechanical vibration. That is, this type of apparatus is such that the volume of the chamber into which the ink is supplied is varied by mechanical vibration of a piezo vibratory element in accordance with a signal, whereby the ink is caused to discharge as small droplets. The specific construction thereof is disclosed in U.S. Pat. No. 3,747,120, IEEE Transactions on Industry Applications Vol. IA-13, No. 1, January/February 1977, etc.

A specific example of the droplet forming apparatus for application to the above-described ink jet recording method is already disclosed in U.S. Pat. No. 3,878,519. The droplet forming apparatus disclosed therein may be summarized as follows:

An apparatus for forming droplets at a substantially constant breakoff point and with substantially uniform distances from each other from a liquid stream including: means to supply the liquid stream through an opening or the like;

and means to selectively alter the surface tension of spaced segments of the stream to form droplets at substantially uniform distances from each other and of substantially uniform size, said selectively altering means being applied to each of the spaced segments of the stream as it passes a predetermined portion of its path to initially reduce the surface tension of each of the spaced segments before random break up of the stream into droplets would occur after the stream exits from the opening.

As the "means to selectively alter the surface tension of spaced segments of the stream to form droplets at substantially uniform distances from each other and of substantially uniform size" in such an apparatus, there are specifically a "high intensity light source" and "heating means" proximate to the discharge opening.

This apparatus for forming droplets is not of the type which uses all of the ink supply including the liquid pressurizing means for causing the liquid stream to discharge, the deflection means for droplets and the formed droplets and therefore, requires a gutter for collecting unnecessary ones of the droplets and thus, it is difficult to make the entire apparatus compact. Also, in this apparatus, the degree of the force forming the droplets is originally weak and therefore, there is only obtained insufficient uniformity of the droplet diameter. Further, in the same apparatus, unless strict adjustment of the liquid pressurizing force is effected in the ink supply, it is not possible to provide uniformity of the diameters of the droplets, constant discharge speed thereof and uniformity of the discharge direction thereof.

SUMMARY OF THE INVENTION

It is an object of the present invention to provide an ink jet recording head that may be formed in an efficient manner, while maintaining an accurate distance between a bubble generating means and a discharge opening.

In view of this point, it is another object of the present invention to provide an apparatus which is excellent in uniformity of ink droplets discharged, discharge responsiveness or discharge stability and long-time continuous discharge stability.

It is still another object of the present invention to provide a compact apparatus which is capable of high-speed recording.

It is yet another object of the present invention to provide a novel droplet forming apparatus which is easy to manufacture and which can be made into a practical and highly dense multi-orifice type.

According to the present invention, there is provided a droplet forming apparatus in which at a portion of a fine bore providing a passageway of liquid, means for generating a bubble in the liquid introduced into said fine bore is disposed and generation and disappearance of said bubble is effected to thereby cause said liquid to discharge through an opening communicated with said fine bore characterized in that the bubble generated in said liquid produces a sufficient pressure action to cause droplets of substantially uniform diameter to discharge and said means is disposed at such a position that said bubble is not communicated with the atmosphere.

The invention will become more fully apparent from the following detailed description thereof taken in conjunction with the accompanying drawings.

BRIEF DESCRIPTION OF THE DRAWINGS

FIGS. 9A and 9B to FIG. 12 illustrate an embodiment of the present invention.

DESCRIPTION OF THE PREFERRED EMBODIMENTS

In the thus constructed droplet forming apparatus of the present invention, signal energy is effectively used to cause ink to discharge and fly as droplets, thus greatly improving the discharge efficiency of ink droplets, discharge responsiveness and long-time continuous recording capability. Above all, in the apparatus of the present invention, the size and discharge direction of ink droplets discharged through the discharge orifice are not at all disturbed and the apparatus is excellent in uniformity of discharged ink droplets and discharge stability.

Also, the apparatus of the present invention is simple in construction and the minute machining thereof can be easily accomplished so that the droplet forming head portion itself can be made much more compact as compared the conventional apparatus, and the simplicity of the construction thereof and the ease of the machining thereof lead to great ease with which a highly dense multi-orifice array indispensable for high-speed recording can be realized. Further, the apparatus of the present invention has remarkable features that removal of a signal entering electrode can be accomplished very easily, that in the realization of the multi-orifice array, the array construction of the discharge orifice in the droplet forming head portion can be arbitrarily designed as desired and that such head portion can be very easily made into a bar-like construction.

Figure 1:
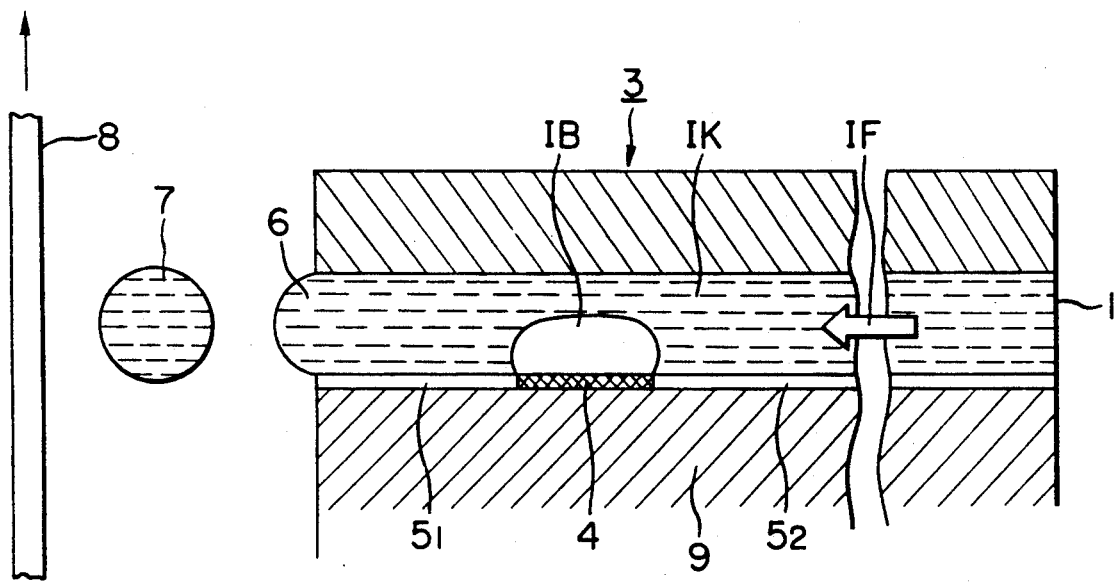
FIG. 1 is a schematic cross-sectional view of a droplet forming apparatus illustrating the recording principle of the present invention.

The invention will hereinafter be described with respect to an embodiment thereof shown in the drawings. Reference is first made to FIG. 1 to generally describe the ink jet recording system by the droplet forming apparatus of the present invention. For convenience of description, this shown embodiment will be described by taking a single orifice type droplet forming apparatus as an example, although it is not intended that the present invention be restricted thereto. That is, the present invention can also realize a multi-array orifice type apparatus easily.

In FIG. 1, ink IK introduced in the direction of arrow IF from an ink supply portion, not shown, through an introduction port 1 flows into an action chamber 2 comprising an elongated bore formed in a recording head portion 3 to fill the chamber. A heat generating member 4 attached to a portion of the action chamber 2 is in contact with the ink IK which has flowed into the action chamber 2 and, when this heat generating member 4 is electrically energized to generate heat and heat the ink IK above its gasification temperature, a bubble IB is momentarily formed in the ink IK.

The heat generating member 4 generates a sufficient thermal pulse to gasify the ink IK by being electrically energized through electrodes $5_1$ and $5_2$ connected to the heat generating member, and this heat is applied to the ink IK. This heat action causes the state change of the ink IK such as gasification, as a result of which the bubble IB is formed to increase the internal pressure of the action chamber 2. In response to such increase in the internal pressure, the ink IK is discharged through an orifice 6 and this becomes a droplet 7 which flies and adheres to a recording member 8 such as paper or the like, thus accomplishing the recording.

The heat generating member 4 is provided on a base plate 9 and in contact with a portion of the action chamber 2 and, when a voltage is applied thereto through the electrodes $5_1$ and $5_2$ in accordance with the input of a recording signal, the heat generating member generates pulse-like heat. Thus, in the shown embodiment, recording by an ink droplet corresponding to the input signal is accomplished by the ink droplet 7 which is projected and adhered to the recording member 8.

In the above-described ink jet recording system, the quality of the discharge state of the ink droplet is greatly affected depending on the effective heat generating area of the heat generating member 4 and the position whereat this heat generating member 4 is installed relative to the action chamber 2 and therefore, sufficient attention must be paid to the setting thereof. According to the findings which the inventors have obtained by making and studying various forms of droplet forming apparatus based on FIG. 1 and different constructions and arrangements, the position whereat the heat generating member 4 is installed in the action chamber 2, particularly, the relative positional relation of the heat generating member to the discharge orifice 6, is a very important factor which governs the quality of the discharge state of the ink droplet.

That is, where the heat generating member 4 is too close to the discharge orifice 6, the bubble IB created in the ink IK is communicated with the atmosphere through the orifice 6 and therefore, the ink IK discharged through the orifice 6 does not form a droplet of a predetermined size but is divided into fog-like fine droplets of irregular diameters, and these fine droplets tend to splash. Also, in an extreme case where the heat generating member 4 extends even to the discharge orifice 6, no ink droplet is discharged even if the bubble IB is created.

To avoid such inconveniences, it is desirable that the location of the heat generating member 4 be spaced apart from the discharge orifice in a predetermined range and, if the spacing between the heat generating member 4 and the discharge orifice 6 departs from said predetermined range, the diameters of discharged ink droplets become irregular while, at the same time, the initial speed of the discharged ink droplets is reduced until, at last, a sufficient pressure action to cause discharge of ink droplets is not imparted to the ink IK in the action chamber 2 and therefore, the spacing between the heat generating member and the discharge orifice is limited. According to the studies carried out by the inventors regarding these conditions, it has been found that when the diameter of the discharge orifice is represented by "d" (the discharge orifice can assume any arbitrary shape such as circular shape, square shape or the like and therefore, generally, the maximum diameter thereof is regarded the diameter thereof), it is advisable to set the heat generating member 4 in the action chamber 2 so that the edge of the heat generating member which is adjacent to the discharge orifice 6 is spaced apart from the discharge orifice 6 in the range of about d to about 50d. Further, it has been found that when importance is attached to the discharge speed of the ink droplet, it is preferable to set the heat generating member 4 in the range of about 10d to about 30d and that when importance is attached to the uniformity of discharged ink droplets and the long-time continuous discharge stability, it is desirable to set the heat generating member 4 in the range of about d to about 10d. That is, when the droplet forming apparatus is constructed while satisfying the above-described conditions, the uniformity of the size of the ink droplets, the stability of the discharge direction thereof, the discharge speed thereof or the stability thereof with lapse of time can be maintained at a practicable level.

Incidentally, the embodiment of FIG. 1 previously described in detail is shown with respect only to a mode in which the recording is effected with the recording member 8 being moved in the direction of arrow, whereas the recording mode using the apparatus of the present invention is not limited to such mode. That is, the recording member 8 should only be moved relative to the orifice 6 and therefore, various changes may be made so that the recording member 8 is moved in the direction opposite to the direction of arrow, that the recording member 8 is moved back and forth with the plane of the drawing sheet as the standard or that the orifice 6 is moved in any desired direction with the recording member 8 being fixed.

Further, it is arbitrary and very to apply the present invention to a multi-orifice array recording apparatus.

On the other hand, in the droplet forming apparatus of the present invention, it is desirable for the purpose of efficiently transmitting to the ink IK the heat generated member 4 be installed on the inner wall of the action chamber 2, but it is not easy to secure the effective area thereof (the area capable of generating the quantity of heat necessary to cause the ink to be discharged) in the action chamber 2 which comprises a fine bore generally having a cross-sectional area of the order of 30–250 $\mu m\phi$.

Nevertheless, in the present invention, the heat generating member 4 is elongated in the axial direction of the action chamber 2 so as to secure the effective area in the fine action chamber 2.

Figure 2:
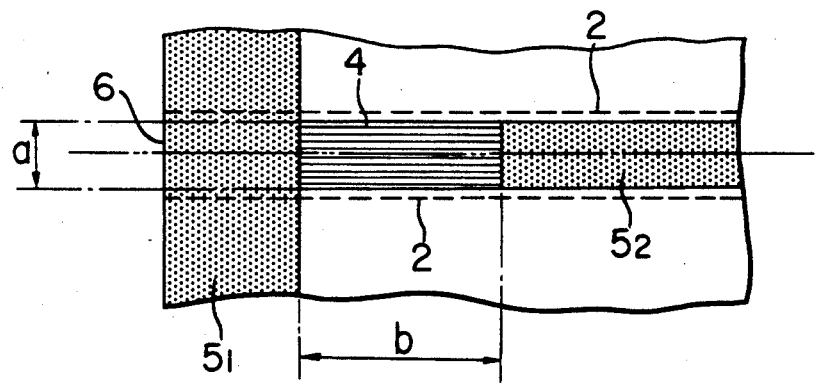
FIGS. 2 to 8 are schematic plane views for illustrating the examples of the configuration of a heat generating member used in the present invention.
Figure 3:
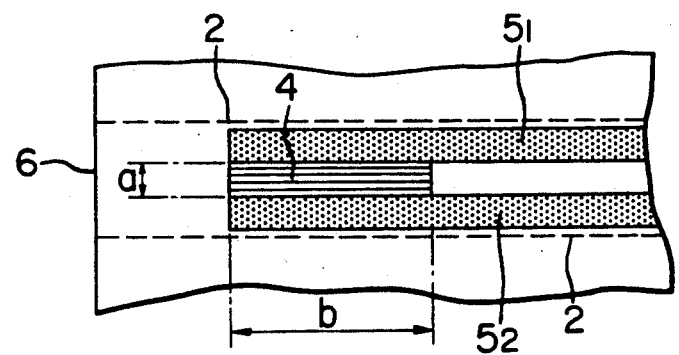
Figure 4:
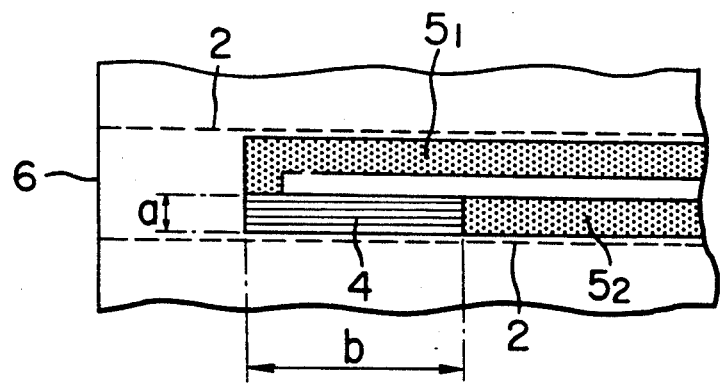
Figure 5:
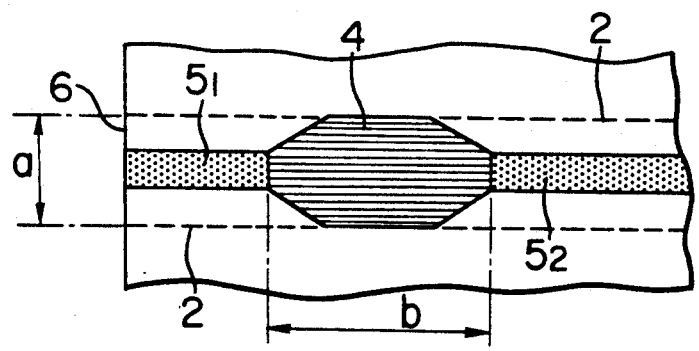
Figure 6:
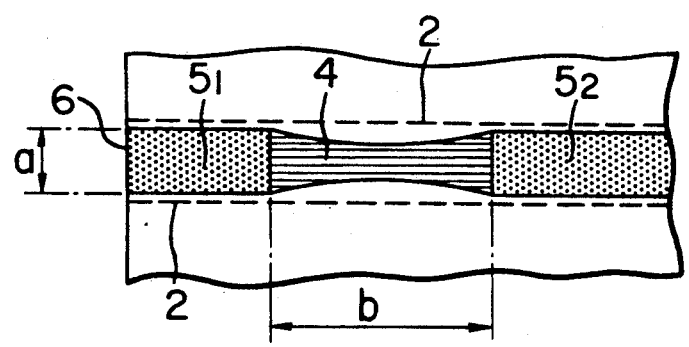
Figure 7:
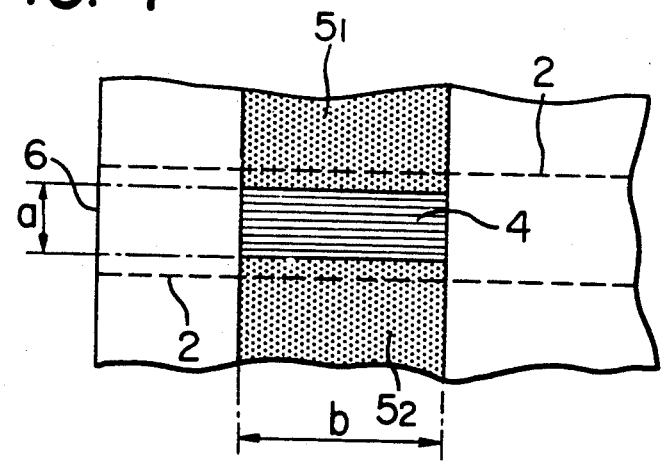
Figure 8:
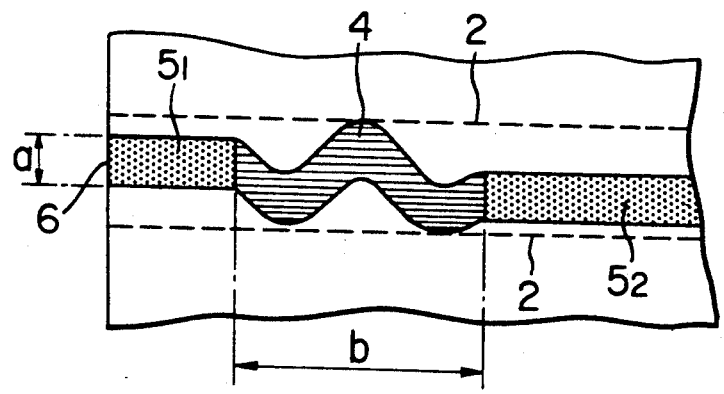

This will further be described with respect to a specific example. The heat generating member 4 suitable for the present invention, as shown in the schematic plane view of FIG. 2, is a planar heat generating resistor installed within the area of the action chamber 2 indicated by dot-and-dash lines and having a shorter side a (length $l_1$) orthogonal to the axis (dots-and-dash line) of the action chamber 2 and a longer side b having a length of $2 \times l_1$ or more in the axial direction of the action chamber 2.

Now, according to the ink jet recording system of the present invention, the planar shape of the heat generating member 4 is never reproduced into a record shape (a dot shape by ink droplet) and can therefore be determined with a considerable degree of freedom unlike the case of the so-called conventional thermal head which is in contact with thermal paper to effect recording. Accordingly, the present invention can also adopt various forms of heat generating member 4 as shown, for example, in FIGS. 3 to 8 which are schematic plane views similar to FIG. 2.

In the examples shown in FIGS. 2 to 8, the components similar to those in FIG. 1 are given similar reference characters.

Incidentally, the heat generating members 4 mentioned in the shown examples are constructed substantially similarly to the thermo-sensitive printing head used in the field of thermo-sensitive recording, and they are generally classified into thick film heads, thin film heads and semiconductor heads by the methods of making them and the differences between the heat generating resistors, and all of them are usable in the present invention. However, when the ink jet recording of high speed and high resolving power is to be effected, it is particularly advantageous to utilize a thin film head.

The ink IK used in the present invention may be prepared by dissolving or dispersing a wetting agent, for example, ethylene glycol, a surface active agent and various dyes into a main solvent, for example, water, ethanol, toluene or the like. In order to prevent the discharge orifice from being clogged, it is desirable to pre-filtrate insoluble particles or the like by a filter.

The invention will hereinafter be described in further detail with respect to the shown embodiment.

Figure 9A:
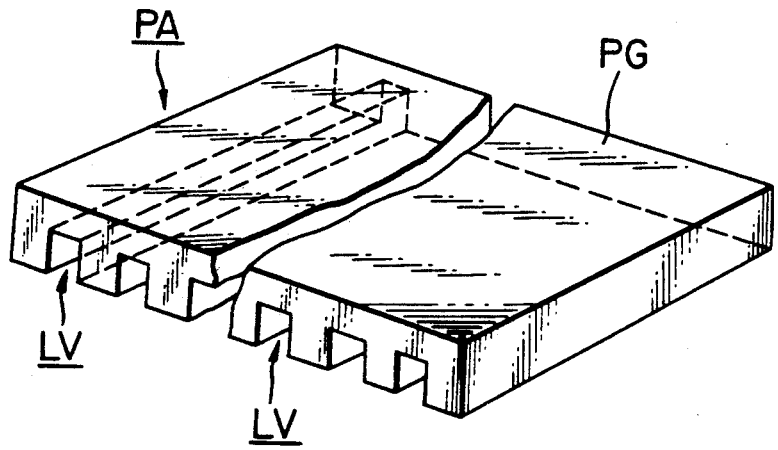
Figure 9B:
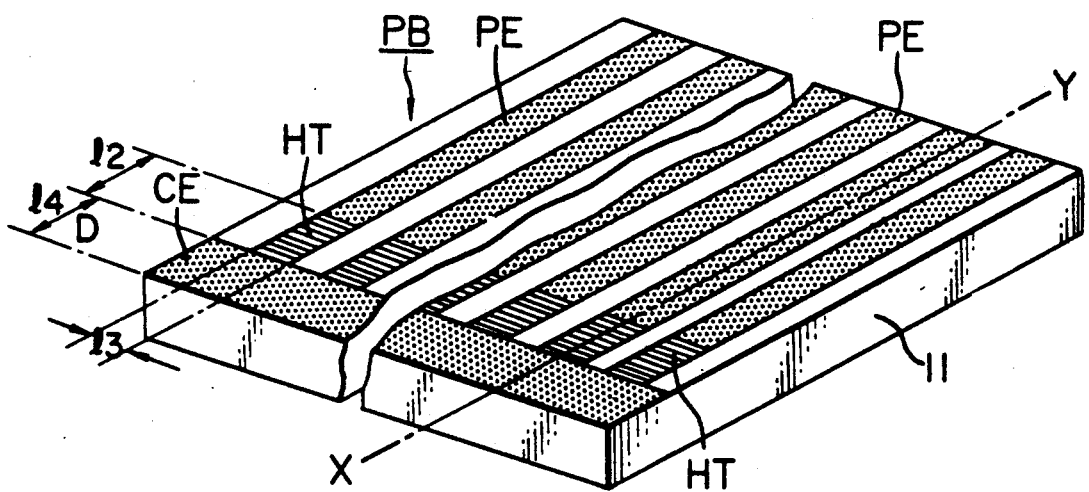

This shown embodiment will be described in accordance with the assembling process of the multi-orifice array recording head. In FIGS. 9A and 9B, two components PA and PB for forming the action chamber block of the multi-orifice array recording head are depicted in schematic perspective view. FIG. 9A shows the component PA and FIG. 9B shows the component PB. The component PA is prepared in the following procedures.

First, both surfaces of a flat plate of alkali metal fluoride photosensitive glass (a composition containing $SiO_2$, $Li_2O$, $Na_2O$, $K_2O$, $Al_2O_3$, Au, AgCl and $CeO_2$) is polished, whereafter it is cut into a size of 100 mm×100 mm (thickness 2 mm). As the photosensitive glass of this kind, Photoceram and Photoform (tradenames: produced by Corning Co., Inc.) are commercially available and any of these may be used. Next, for the thus prepared photosensitive glass plate PG, a coupling wave of 310 mm of dye laser light resulting from exciting an unshown $N_2$ laser to 620 mm has been taken out to thereby print interference stripes of pitch 100 $\mu m$ and width 50 $\mu m$ on the photosensitive glass plate. These interference stripes have been uniform in the surface of 90 mm×90 mm. The electric power of the laser light source has been 10 W and, since the photosensitive glass has an absorption of $Ce^{++}$ for the wavelength 310 $\mu m$, exposure has been selectively effected by a laser light of the wavelength corresponding to such absorption. After the interference stripes have been printed, the glass plate PG has been heated at about 600° C. for an hour to crystallize the same. The surface of the glass plate PG has been polished to a thickness of about 0.1 mm to further smooth such surface, whereafter the surface of the glass plate opposite to the polished surface has been coated with resin, and then the glass plate PG has been immersed in about 5% HF aqueous solution and subjected to etching while applying an ultrasonic wave thereto. Incidentally, in this etching, the etching speed of the crystallized portion of the glass plate PG has been sufficiently higher than that of the noncrystalline portion and actually, there has been a difference of the order of 20:1 in the etching rate.

By the above-described treatment, as shown in FIG. 9A, a predetermined number of long grooves LV each having a cross-section of 50 μm×50 μm have been formed at a pitch of 100 μm on the glass plate PG.

These grooves LV are not restricted to the above-described embodiment, but grooves each having a cross-section of 10 μm×10 μm-150 μm×150 μm may be freely formed in the range of pitch 30 μm-200 μm by adjusting an exposure optical system, etc.

By the above-described technique, total six treated glass plates PG have been prepared.

Figure 10:
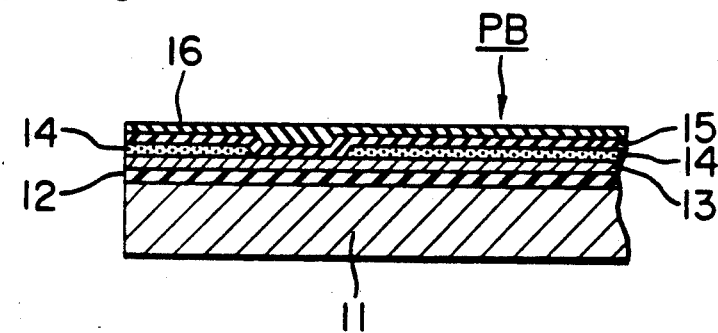

Next, epoxy resin as a cementing material is applied to the grooved surface of each glass plate PG thus formed with long grooves, by the dipping method. In this case, if the glass plate PG is lifted in a direction parallel to the axes of the grooves LV, there is obtained a coating of epoxy resin which is substantially uniform along the wall surfaces of the formed grooves LV. Thereafter, this coating has been preparatorily dried at 100° C. for about five minutes and half-cured, whereafter the glass plate has been cut into a predetermined size to obtain a component PA. The cementing material is not limited to the epoxy resin. The cementing material used herein is a material which creates cementing action by heating, and may be, for example, an organic compound adhesive agent such as epoxy resin adhesive, phenolic resin adhesive, urethane resin adhesive, silicone resin adhesive, triazine resin, BT re in or the like, or inorganic compounds such as melted silver salts, low melting point glasses or the like mentioned in Japanese Patent Publication No. 20227/1963. Above all, in the case of the latter inorganic compounds, they are often used not in liquidous phase but in powder form. Separately from the component PA, the component PB as shown in FIG. 9B is also prepared. This component PB can be obtained by successively laminating a heat accumulating layer ($SiO_2$ sputter film of 2-3 μm) 12, a heat generating resistor layer ($HfB_2$ sputter film of 500-1000 Å) 13, an electrode layer (evaporated aluminum layer of 700-800 Å) 14, a protective layer ($SiO_2$ sputter film of 1 μm) 15 and a stopping layer (Parylene, silicone or $Ta_2O_3$ sputter film) 16 on a substrate (thickness about 0.6 mm) formed of alumina, single crystal silicon or a metal such as aluminum, iron or the like, as shown in FIG. 10 which is a cross-sectional view taken along line X-Y of FIG. 9B, and thereafter cutting the same into a predetermined size. In this case, the electrode layer 14 is etched into a predetermined pattern and separated into individual lead electrodes PE and a common lead electrode CE, as shown in the perspective view of FIG. 9B. At the same time, the heat generating resistor layer 13 has been exposed in a rectangular pattern HT at the same pitch as the long grooves LV in the component PA so that the length of $l_2$ is 250 μm and the length of $l_3$ is 50 μm. The protective layer 15 and the stopping layer 16 shown in FIG. 10 may not be laminated in some cases.

A total of six substrates 11 each formed with a predetermined number of heat generating resistor patterns HT as described above have been prepared. These substrates 11 have been cut so that the width $l_4$ of the common lead electrode CE is 80 μm (component B-1), 150 μm (component B-2), 350 μm (component B-3), 800 μm (component B-4), 1500 μm (component B-5) and 2500 μm (component B-6), respectively.

Figure 11:
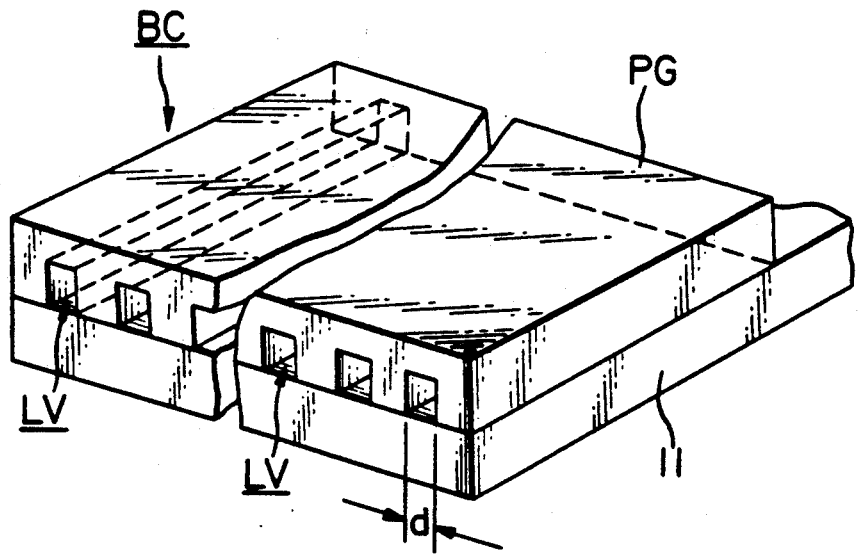

The thus prepared six components PA and PB are located with respect to each other so that the grooves LV correspond in position to the heat generating resistor patterns HT as shown in FIG. 11, whereafter they are adhesively secured to each other. Next, these are heated at about 100° C. for ten minutes to half-cure an unshown adhesive layer and at this point of time, the presence or absence of any positional deviation therebetween or clogging of the grooves LV is checked up. When the result of this check-up is "no", the components PA and PB are separated from each other, whereafter the component PB is cleaned for re-utilization. The component PA is abandoned. When there is found no defect, the component PB is heated at 100° C. for fifty minutes and at 180° C. for two hours to completely cure the adhesive layer. Thereafter, the presence or absence of clogging of the grooves LV is again checked up and, when there is found no defect, the assembled action block BC is transferred to the next step of process. Thus, when the components PA and PB are assembled, the width $l_4$ of the common electrode CE also represents the distance between each orifice and the edge of the corresponding resistor pattern HT closest to that orifice.

Figure 12:
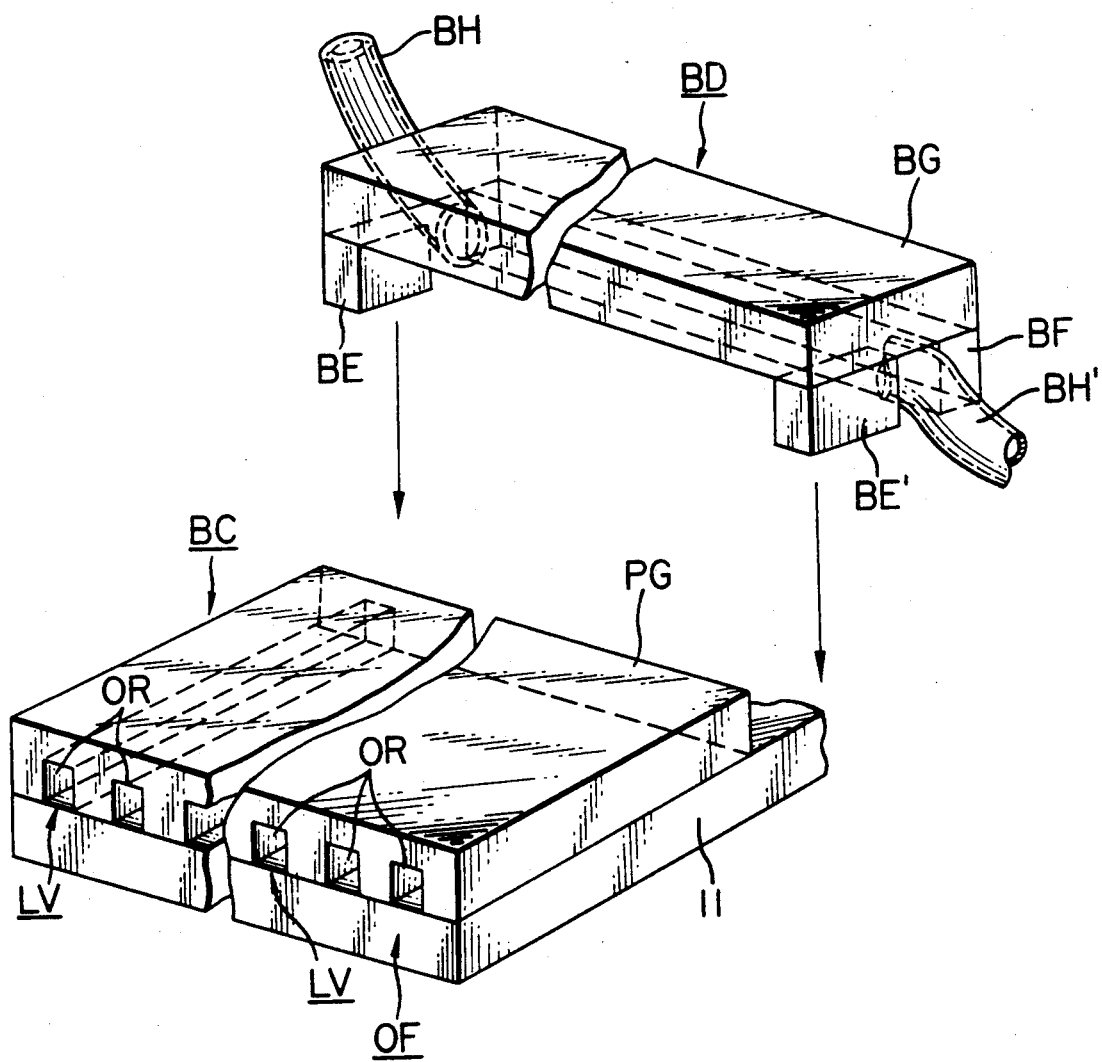

In the ensuing step, assembly of a relay chamber block BD concerned with ink supply as shown in FIG. 12 is carried out. First, a cementing material of the following composition is applied to side plate components BE and BE', and then the relay chamber block BD is located with respect to the action block BC as indicated by arrows in FIG. 12, whereafter they are heated at about 60° C. for one minute to half-cure the cementing material, and then the presence or absence of any positional deviation therebetween or inflow of the cementing material into the other component is checked up.

Cementing material:
 Epikoat 828 (produced by Shell Chemical Co.) 100 parts by weight
 Epomate B-002 (produced by Aginomoto Co.) 40 parts by weight When the result of this check-up is "no", the components BE and BE' are separated from the block BC, whereafter the two are cleaned for re-utilization. When there is no defect, they are heated at about 60° C. for thirty minutes to cure the cementing material.

Next, a cementing material is applied to a rear end component BF and the location thereof is effected, whereafter it is heated at about 60° C. for one minute to half-cure the cementing material, and then a check-up similar to that in the previous step is effected and, when the result of the check-up is "no", the component BF is cleaned and, when there is no defect, it is heated at about 60° C. for thirty minutes to cure the cementing material.

Subsequently, a cementing material is applied to a top plate component BC and the location thereof is effected, whereafter the top plate component is heated at about 60° C. for one minute to half-cure the cementing material, and then a check-up similar to that in the previous step is carried out and, when the result of this check-up is "no", the top plate component is cleaned in the same manner as in the previous step and, when there is no defect, it is heated at about 60° C. for thirty minutes and further at about 100° C. for ten minutes to completely cure the cementing material.

Subsequently, tubular components BH and BH' are inserted into predetermined positions in the block which has assembled by said step, and the clearances are filled with a cementing material. In this case, it is necessary to cure the cementing material slowly and therefore, the assembly is left at room temperature for thirty minutes. Next, the presence or absence of inflow of the cementing material into the components BH and BH' or inflow of the cementing material into the ink supply relay chamber is checked up. When the result of this check-up is "no", the assembly is cleaned for re-utilization in the same manner as in the previous step. When there is no defect, it is heated at about 60° C. for thirty minutes and further at 100° C. for ten minutes to completely cure the cementing material.

In this manner, the connection of the relay chamber block BD to the rear of the action block BC is completed. Thereafter, the end face OF of the action block BC whereat discharge orifices OR are installed is polished by the use of polishing sand (#1000 or more) so as to form a smooth surface. Subsequently, cleaning is effected to remove any polishing sand and unnecessary materials which have entered into the grooves LV through the orifices OR during the polishing. Whether or not the end face OF has become a completely flat surface and whether or not the interior of the grooves LV has been completely cleaned is checked up and, when the polishing is incomplete, the end face OF is re-polished and subsequently cleaning is effected. A similar check-up is effected and, when the result of the check-up is "No", this step is repeated and, when there is no defect, the assembly of the block BC and the block BD is dried.

Further, the completed head is joined to an aluminum plate and the lead electrodes are connected to a flexible wiring plate.

A specific example of the ink jet recording effected by the use of the thus obtained recording head will now be described by reference to FIG. 12. In FIG. 12, for convenience of illustration, the various component blocks are shown as being separated from one another. Actually, however, the various components and blocks are of course made integral with one another by cementing, as described above. In this shown example, recording ink is first introduced into each long grooves LV through the components BH and BH'. Next, when an electrical pulse signal is applied to the heat generating resistor, not shown, there is generated a thermal pulse and as a result, the ink is momentarily gasified. By the bubble created by this gasification, a pressure wave (action force) is applied to the ink, as a result of which the ink discharges and flies in the form of substantially uniform droplets through the orifices OR communicated with the grooves LV and these droplets adhere to the recording member, not shown, thereby accomplishing the recording.

When an experiment of ink discharge by the six recording heads completed as described above has been actually carried out by the use of ink of the following composition under the experimental conditions as mentioned below, stable discharge of ink droplets has taken place over 10$^9$ times or more in any of these recording heads and the dots obtained have been substantially uniform. The discharge speeds of the ink droplets have been as shown in the table below.

| Water | | | 70 parts by weight | |
| Diethyleneglycol | | | 29 parts by weight | |
| Black dye | | | 1 part by weight | |
| Recording head | Applied pulse conditions | | | Ink droplet |
| No. | D(l$^4$ in component PB) | Voltage | Pulse width | Frequency | discharge speed (unit: m/sec.) |
|---|---|---|---|---|---|
| 1 | 80 μm | | | | 1.3 |
| 2 | 150 μm | | | | 1.5 |
| 3 | 350 μm | | | | 2.0 |
| 4 | 800 μm | 40 V | 10 μsec. | 10 KHz | 3.2 |
| 5 | 1500 μm | | | | 3.6 |
| 6 | 2500 μm | | | | 1.9 |

As has been described above in detail, according to the droplet forming apparatus shown in the embodiment, there can be provided an ink jet recording apparatus in which the responsiveness of ink droplet discharge to the information signal input and the discharge state of ink droplets are very good and the output level is high so that record images of good quality can be provided at high speed.

Although not shown, the droplet forming apparatus of the present invention described above in detail may of course be modified into a multi-orifice array type to sufficiently achieve the aforementioned objects. In this case, the liquid supply to each action chamber may be effected through a common liquid supply chamber communicated with the liquid introduction port of each of a plurality of action chambers.

What we claim is:

1. A droplet forming apparatus for high speed recording, comprising:
   means for generating a high frequency driving signal;
   a recording head having a passageway for a liquid with an opening for discharging liquid from said passageway, said opening having a maximum diameter d; and
   bubble generating means, formed on a substrate and positioned in said passageway, for sequentially generating a bubble in the liquid in response to the high frequency signal, with the generation and disappearance of the bubble causing the liquid to be discharged through said opening, said bubble generating means having an edge closest to said opening which is spaced from said opening by a predetermined distance D in the range of d to 50d, wherein the relationship of said maximum diameter d and said predetermined distance D produces a bubble of such a size as to generate in the liquid a pressure to cause droplets to be discharged from said opening without the bubble communicating with the atmosphere outside said passageway and said predetermined distance D and the frequency of the driving signal are preselected so as to discharge droplets at a speed of 1.3 m/sec. or greater, wherein said predetermined distance D is formed by cutting and removing a portion of the substrate between the bubble generating means and an edge of the substrate corresponding to said opening.

2. The droplet forming apparatus according to claim 1, wherein said bubble generating means is a heat generating member.

3. The droplet forming apparatus according to claim 1, wherein said distance D is about 10d to 30d and droplets are discharged at a speed of at least about 2.6 m/sec.

4. The droplet forming apparatus according to claim 1, wherein said bubble generating means includes a planar heat generating member elongated along the length of said fine bore.

5. The droplet forming apparatus according to claim 1 or 4, wherein said bubble generating means is attached to the inner wall of said fine bore.

6. The droplet forming apparatus according to claim 1, wherein said distance D is about d to 10d and droplets are discharged with a substantially uniform diameter.

7. The droplet forming apparatus according to claim 1, wherein said opening has an area within the range of 10 μm×10 μm to 150 μm×150 μm.

8. The droplet forming apparatus according to claim 1, wherein the high frequency driving signal has a frequency of 10 KHz.

9. The droplet forming apparatus according to claim 8, wherein the high frequency driving signal has a pulse width of 10 μsec.

10. A droplet forming apparatus according to claim 1, wherein said recording head is a multi-nozzle head having a plurality of openings with substantially the same size.

11. An ink jet recording method for high speed recording, which comprises:
   applying a high frequency input signal to a heat generating means located in a chamber containing a liquid and having a discharge orifice with a maximum diameter d, the heat generating means being spaced a predetermined distance D within a range of d to 50d from the discharge orifice; and
   driving the heat generating means in response to the high frequency input signals to repetitively cause formation of a bubble in the liquid and discharge of liquid droplets from the discharge orifice;
   wherein the relationship of the predetermined distance D of the heat generating means to the maximum diameter d of the discharge orifice is such that formation and disappearance of the bubble in the liquid in the chamber produces sufficient pressure to cause droplets to be discharged from the orifice without the bubble communicating with the atmosphere outside of the chamber and the predetermined distance D and the frequency of the applied input signals are preselected so as to discharge droplets at a speed of 1.3 m/sec. or greater.

12. The ink jet recording method according to claim 11, wherein the high frequency input signal applied to said heat generating means has a frequency of 10 KHz.

13. The ink jet recording method according to claim 12, wherein the high frequency input signal applied to said heat generating means has a pulse width of 10 μsec.

14. An ink jet recording apparatus for high speed recording, comprising:
   means for generating a high frequency driving signal;
   a recording head having a passageway for a liquid with an opening for discharging liquid from said passageway, said opening having a maximum diameter d; and
   bubble generating means, positioned in said passageway and having a pair of electrodes for supplying the high frequency signal to opposite sides of said bubble generating means with respect to said passageway, said bubble generating means sequentially generating a bubble in the liquid in response to the high frequency signal, with the generation and disappearance of the bubble causing the liquid to be discharged through said opening, said bubble generating means having an edge closest to said opening which is spaced from said opening by a predetermined distance D in the range of d to 50d, and wherein one of said electrodes is attached to said side of said bubble generating means proximate to said opening and outside the space between said bubble generating means and said opening, wherein the relationship of said maximum diameter d and said predetermined distance D produces a bubble of such a size as to generate in the liquid a pressure to cause droplets to be discharged from said opening without the bubble communicating with the atmosphere outside said passageway and said predetermined distance D and the frequency of the driving signal are preselected so as to discharge droplets at a speed of 1.3 m/sec. or greater.

15. An ink jet recording method for high speed recording, which comprises:
   applying a high frequency input signal to a heat generating means mounted on a substrate and located in a chamber containing a liquid and having a discharge orifice with a maximum diameter d, the heat generating means being spaced a predetermined distance D within a range of d to 50d from the discharge orifice, wherein the predetermined distance D is formed by cutting and removing a portion of the substrate between the heat generating means and an edge of the substrate corresponding to the discharge orifice; and
   driving the heat generating means in response to the high frequency input signals to repetitively cause formation of a bubble in the liquid and discharge of liquid droplets from the discharge orifice,
   wherein the relationship of the predetermined distance D of the heat generating means to the maximum diameter d of the discharge orifice is such that formation and disappearance of the bubble in the liquid in the chamber produces sufficient pressure to cause droplets to be discharged from the orifice without the bubble communicating with the atmosphere outside of the chamber and the predetermined distance D and the frequency of the applied input signals are preselected so as to discharge droplets at a speed of 1.3 m/sec. or greater.

16. An ink jet recording method for high speed recording, which comprises:
   applying a high frequency input signal to a heat generating means located in a chamber containing a liquid and having a discharge orifice with a maximum diameter d, the heat generating means being spaced a predetermined distance D within a range of d to 50d from the discharge orifice, the heat generating means having a pair of electrodes for supplying the high frequency signal to opposite sides of the heat generating means with respect to said chamber, wherein one of the electrodes is attached to the side of the heat generating means proximate to the orifice and outside the space between the heat generating means and the orifice; and
   driving the heat generating means in response to the high frequency input signals to repetitively cause formation of a bubble in the liquid and discharge of liquid droplets from the discharge orifice,
   wherein the relationship of the predetermined distance D of the heat generating means to the maximum diameter d of the discharge orifice is such that formation and disappearance of the bubble in the liquid in the chamber produces sufficient pressure to cause droplets to be discharged from the orifice without the bubble communicating with the atmosphere outside of the chamber and the predetermined distance D and the frequency of the applied input signals are preselected so as to discharge droplets at a speed of 1.3 m/sec. or greater.

17. An ink jet recording head for high speed recording, comprising:
a body having a passageway for a liquid and an opening for discharging liquid from said passageway, said opening having a maximum diameter d; and
bubble generating means, formed on a substrate and positioned in said passageway, for sequentially generating a bubble in the liquid in response to a high frequency signal, with the generation and disappearance of the bubble causing the liquid to be discharged through said opening, said bubble generating means having an edge closest to said opening which is spaced from said opening by a predetermined distance D in the range of d to 50d, wherein the relationship of said maximum diameter d and said predetermined distance D produces a bubble of such a size as to generate in the liquid a pressure to cause droplets to be discharged from said opening without the bubble communicating with the atmosphere outside said passageway and said predetermined distance D and the frequency of the driving signal are preselected so as to discharge droplets at a speed of 1.3 m/sec. or greater, wherein said predetermined distance D is formed by cutting and removing a portion of the substrate between the bubble generating means and an edge of the substrate corresponding to said opening.

18. An ink jet recording head for high speed recording, comprising:
a body having a passageway for a liquid with an opening for discharging liquid from said passageway, said opening having a maximum diameter d; and
bubble generating means, positioned in said passageway and having a pair of electrodes for supplying a driving signal to opposite sides of said bubble generating means with respect to said passageway, said bubble generating means sequentially generating a bubble in the liquid in response to the driving signal, with the generation and disappearance of the bubble causing the liquid to be discharged through said opening, said bubble generating means having an edge closest to said opening which is spaced from said opening by a predetermined distance D in the range of d to 50d, one of said electrodes being attached to said side of said bubble generating means proximate to said opening such that it is outside the space between said bubble generating means and said opening, wherein the relationship of said maximum diameter d and said predetermined distance D produces a bubble of such a size as to generate in the liquid a pressure to cause droplets to be discharged from said opening without the bubble communicating with the atmosphere outside said passageway and said predetermined distance D and the frequency of the driving signal are preselected so as to discharge droplets at a speed of 1.3 m/sec. or greater.

19. An ink jet recording head, comprising:
a plurality of discharge openings formed in a discharge opening surface for discharging ink;
a plurality of liquid passageways for holding ink, each said liquid passageway communicating independently with a respective discharge opening; and
a plurality of heat generating members, each said heat generating member corresponding to a liquid passageway for providing thermal energy to the ink in said liquid passageway for abruptly forming a bubble for discharging ink from said discharge opening, each said heat generating member having a pair of electrodes for driving said heat generating member individually, each said pair of electrodes and corresponding heat generating member forming a U-shaped wiring portion, each said U-shaped wiring portion corresponding to a respective liquid passageway, wherein said recording head is manufactured using a cutting process for forming said discharge opening surface.

20. An ink jet recording head according to claim 19, wherein each said pair of electrodes are arranged in the same direction.

21. An ink jet recording head according to claim 19, wherein a section of said pair of electrodes are parallel.

22. An ink jet recording head according to claim 19, wherein said liquid passageways are arranged along said electrodes.

23. An ink jet recording head according to claim 19, wherein said U-shaped wiring portion forms a square bracket shape including said heat generating member.

24. An ink jet recording head according to claim 19, wherein said U-shaped wiring portion is proximate said discharge opening.

25. An ink jet recording head according to claim 19, wherein the relationship between the maximum diameter d of said discharge opening and the distance D between said discharge opening and the edge of said heat generating member proximate said discharge opening, is represented by $d \leq D \leq 50d$, such that ink discharged from said discharge opening does not splash.

26. An ink jet recording head according to claim 19, wherein the relationship between the maximum diameter d of said discharge opening and the distance D between said discharge opening and the edge of said heat generating member proximate said discharge opening, is represented by $d \leq D \leq 10d$, such that ink discharged from said discharge opening does not splash.

27. An ink jet recording head, comprising:
a plurality of discharge openings formed in a discharge opening surface for discharging ink;
a plurality of liquid passageways for holding the ink, each said liquid passageway communicating independently with a respective discharge opening;
a plurality of heat generating members, each said heat generating member corresponding to a liquid passageway for abruptly forming a bubble in the ink in said liquid passageway for discharging ink from said discharge opening; and
pairs of electrodes, each said pair of electrodes being connected to a corresponding heat generating member for driving said heat generating member, each said pair of electrodes and corresponding heat generating member forming a U-shaped wiring portion, each said U-shaped wiring portion corresponding to a respective liquid passageway, wherein said recording head is manufactured using a cutting process to form said discharge opening surface.

28. An ink jet recording head according to claim 27, wherein each said pair of electrodes are arranged in the same direction.

29. An ink jet recording head according to claim 27, wherein a section of said pair of electrodes are parallel.

30. An ink jet recording head according to claim 27, wherein said liquid passageways are arranged along said electrodes.

31. An ink jet recording head according to claim 27, wherein said U-shaped wiring portion forms a square bracket shape including said heat generating member.

32. An ink jet recording head according to claim 27, wherein said U-shaped wiring portion is proximate said discharge opening.

33. An ink jet recording head according to claim 27, wherein the relationship between the maximum diameter d of said discharge opening and the distance D between said discharge opening and the edge of said heat generating member proximate said discharge opening is represented by $d \leq D \leq 50d$, such that ink discharged from said discharge opening does not splash.

34. An ink jet recording head according to claim 27, wherein the relationship between the maximum diameter d of said discharge opening and the distance D between said discharge opening and the edge of said heat generating member proximate said discharge opening, is represented by $d \leq D \leq 10d$, such that ink discharged from said discharge opening does not splash.

35. An ink jet recording head, comprising:
a substrate;
a plurality of discharge openings formed in a discharge opening surface for discharging ink;
a plurality of liquid passageways for holding the ink, each said liquid passageway communicating independently with a respective discharge opening; and
a plurality of heat generating members provided on said substrate, each said heat generating member corresponding to a liquid passageway for providing thermal energy to the ink in said liquid passageway for abruptly forming a bubble for discharging ink from said discharge opening, each said heat generating member having a pair of electrodes for driving said heat generating member individually, each said pair of electrodes and corresponding heat generating member forming a U-shaped wiring portion, each said U-shaped wiring portion corresponding to a respective liquid passageway, wherein said recording head is manufactured using a cutting process to form said discharge opening surface.

36. An ink jet recording head according to claim 35, wherein each said pair of electrodes are arranged in the same direction.

37. An ink jet recording head according to claim 35, wherein a section of said pair of electrodes are parallel.

38. An ink jet recording head according to claim 35, wherein said liquid passageways are arranged along said electrodes.

39. An ink jet recording head according to claim 35, wherein said U-shaped wiring portion forms a square bracket shape including said heat generating member.

40. An ink jet recording head according to claim 35, wherein said U-shaped wiring portion is proximate said discharge opening.

41. An ink jet recording head according to claim 35, wherein the relationship between the maximum diameter d of said discharge opening and the distance D between said discharge opening and the edge of said heat generating member proximate said discharge opening, is represented by $d \leq D \leq 50d$, such that ink discharged from said discharge opening does not splash.

42. An ink jet recording head according to claim 35, wherein the relationship between the maximum diameter d of said discharge opening and the distance D between said discharge opening and the edge of said heat generating member proximate said discharge opening, is represented by $d \leq D \leq 10d$, such that ink discharged from said discharge opening does not splash.

43. An ink jet recording apparatus, comprising:
means for generating a signal to drive a heat generating member; and
a recording head manufactured using a cutting process to form a discharge opening surface, said recording head having a plurality of discharge openings formed in the discharge opening surface for discharging ink, a plurality of liquid passageways for holding the ink, each said liquid passageway communicating independently with a discharge opening, heat generating members, each said heat generating member being provided in a corresponding liquid passageway for providing thermal energy to the ink in said liquid passageway for abruptly forming a bubble in the ink, and a pair of electrodes corresponding to each said heat generating member, each said pair of electrodes for individually driving said corresponding heat generating member, wherein said pair of electrodes and corresponding heat generating member form a U-shaped wiring portion, each said U-shaped wiring portion corresponding to a respective liquid passageway.

44. An ink jet recording apparatus according to claim 43, wherein each said pair of electrodes are arranged in the same direction.

45. An ink jet recording apparatus according to claim 43, wherein a section of said pair of electrodes are parallel.

46. An ink jet recording apparatus according to claim 43, wherein said liquid passageways are arranged along said electrodes.

47. An ink jet recording apparatus according to claim 43, wherein said U-shaped wiring portion forms a square bracket shape including said heat generating member.

48. An ink jet recording apparatus according to claim 43, wherein said U-shaped wiring portion is proximate said discharge opening.

49. An ink jet recording apparatus according to claim 43, wherein the relationship between the maximum diameter d of said discharge opening and the distance D between said discharge opening and the edge of said heat generating member proximate said discharge opening, is represented by $d \leq D \leq 50d$, such that ink discharged from said discharge opening does not splash.

50. An ink jet recording apparatus according to claim 43, wherein the relationship between the maximum diameter d of said discharge opening and the distance D between said discharge opening and the edge of said heat generating member proximate said discharge opening, is represented by $d \leq D \leq 10d$, such that ink discharged from said discharge opening does not splash.

* * * * *

UNITED STATES PATENT AND TRADEMARK OFFICE
CERTIFICATE OF CORRECTION

PATENT NO. : 5,204,689
DATED : April 20, 1993
INVENTOR(S) : YOSHIAKI SHIRATO, ET AL.

It is certified that error appears in the above-identified patent and that said Letters Patent is hereby corrected as shown below:

COLUMN 3

Line 41, "the" (first occurrence) should read --to--.

COLUMN 5

Line 38, "very" should read --very easy--.
Line 42, "generated" should read --generated by the heat generating member 4 that this heat generating--.

COLUMN 7

Line 30, "re in" should read --resin--.

COLUMN 9

Line 46, "grooves" should read --groove--.

COLUMN 10

Line 6, "D($1^4$" should read --D($1_4$--.

COLUMN 14

Line 19, "are" should read --is--.

COLUMN 15

Line 2, "are" should read --is--.
Line 52, "are" should read --is--.

UNITED STATES PATENT AND TRADEMARK OFFICE
CERTIFICATE OF CORRECTION

PATENT NO. : 5,204,689
DATED : April 20, 1993
INVENTOR(S) : YOSHIAKI SHIRATO, ET AL.

It is certified that error appears in the above-identified patent and that said Letters Patent is hereby corrected as shown below:

<u>COLUMN 16</u>

Line 37, "are" should read --is--.

Signed and Sealed this

Third Day of May, 1994

Attest:

BRUCE LEHMAN

Attesting Officer

Commissioner of Patents and Trademarks